(12) United States Patent
Kaun et al.

(10) Patent No.: US 9,755,481 B2
(45) Date of Patent: Sep. 5, 2017

(54) ENERGY-GENERATING SCOOTER-MOUNTED APPARATUS

(71) Applicants: Karen Pauline Kaun, Bronx, NY (US); Allieberry Pitter, Bronx, NY (US); Shakeena Julio, Bronx, NY (US); Simeon Tiefel, Siloam Springs, AR (US); Erica Nwankwo, Waltham, MA (US); Lindsey Andrade, Needham, MA (US); Liani Lye, Needham, MA (US); Amon Millner, Needham, MA (US)

(72) Inventors: Karen Pauline Kaun, Bronx, NY (US); Allieberry Pitter, Bronx, NY (US); Shakeena Julio, Bronx, NY (US); Simeon Tiefel, Siloam Springs, AR (US); Erica Nwankwo, Waltham, MA (US); Lindsey Andrade, Needham, MA (US); Liani Lye, Needham, MA (US); Amon Millner, Needham, MA (US)

( * ) Notice: Subject to any disclaimer, the term of this patent is extended or adjusted under 35 U.S.C. 154(b) by 0 days.

(21) Appl. No.: 14/952,826

(22) Filed: Nov. 25, 2015

(65) Prior Publication Data
US 2016/0233741 A1    Aug. 11, 2016

Related U.S. Application Data

(60) Provisional application No. 62/084,248, filed on Nov. 25, 2014.

(51) Int. Cl.
| | | |
|---|---|---|
| H02K 7/18 | (2006.01) |
| B62J 6/12 | (2006.01) |
| H02K 7/10 | (2006.01) |
| B62K 21/08 | (2006.01) |
| B60L 11/18 | (2006.01) |
| B62J 6/08 | (2006.01) |
| B62K 3/00 | (2006.01) |
| B62J 99/00 | (2009.01) |

(52) U.S. Cl.
CPC ........ H02K 7/1846 (2013.01); B60L 11/1809 (2013.01); B62J 6/08 (2013.01); B62K 3/002 (2013.01); B62J 99/00 (2013.01); B62J 2099/004 (2013.01); B62K 2202/00 (2013.01)

(58) Field of Classification Search
CPC .................................. H02K 7/07; H02K 7/116
USPC .................... 310/75 C, 75 D, 67 A; 180/181
See application file for complete search history.

(56) References Cited

U.S. PATENT DOCUMENTS

| | | | | |
|---|---|---|---|---|
| 591,625 | A * | 10/1897 | Farham .................. | H02K 7/116 310/67 R |
| 6,016,022 | A | 1/2000 | Cho | |
| 8,067,848 | B1 | 11/2011 | Vilsaint | |
| 2006/0208561 | A1* | 9/2006 | Fukui ....................... | B60B 7/00 301/110.5 |
| 2010/0019676 | A1 | 1/2010 | Yen | |

(Continued)

FOREIGN PATENT DOCUMENTS

WO    2014153493  A2    9/2014

*Primary Examiner* — Jose Gonzalez Quinones
(74) *Attorney, Agent, or Firm* — Brooklyn Law IP Clinic; Serge Krimnus; Hyo J. Kim

(57) ABSTRACT

An energy-generating and mobile-charging apparatus is provided. The apparatus includes a housing including a shape featuring at least two lobes; and mounting brackets comprising at least two axles protruding from endplates of the housing for removably securing to a scooter and configured to be in contact with the front wheel of the scooter.

5 Claims, 2 Drawing Sheets

(56) References Cited

U.S. PATENT DOCUMENTS

| | | | |
|---|---|---|---|
| 2012/0306327 A1* | 12/2012 | Lee | H02K 7/1846 310/67 A |
| 2013/0145885 A1* | 6/2013 | Kitamura | B62M 25/08 74/473.12 |
| 2015/0015125 A1* | 1/2015 | Webber | B60B 1/041 310/67 A |

* cited by examiner

ENERGY-GENERATING SCOOTER-MOUNTED APPARATUS

BACKGROUND OF THE INVENTION

1. Technical Field

The present invention relates generally to electricity-generating apparatuses and, in particular, to an apparatus coupled to a scooter designed to charge mobile devices by using the rotational energy from the ordinary operation of the scooter.

2. Background

Mobile devices such as smartphones are a staple of the digital age. As such, we are also more dependent on the energy needed to power our mobile devices. Alternating Current (AC) adapters restrict user mobility and convenience. Alternatively, portable batteries/chargers themselves require charging and lose charge over time. The scooter is a popular method of travel among adults and youths, alike. The technology currently available does not address the needs of these users who are greatly mobile and may not have the luxury of a fully portable charger, or an AC source.

SUMMARY OF INVENTION

Embodiments of the present invention include a scooter-mounted mobile device charger solves the above problems. The apparatus rotates with the front wheel to the front wheel to power an enclosed motor, which then generates a positive voltage that flows through the electrical circuitry enclosed in to apparatus to an accessible charging hardware. The resulting voltage is modified in order to be suitable for mobile device charging. Through this apparatus, users can charge their mobile device while cruising through the city. The modularity of the apparatus allows flexibility for easy use across user generated or partially user generated motion machines, such as bicycles, wheelchairs, or scooters. In one embodiment, the apparatus is fitted specifically for a scooter.

The present embodiment provides mobile device charging while the user is operating a scooter. The apparatus contains a number of mechanical components including a spinning housing, a Direct Current (DC) motor, and a mounting bracket. The mounting bracket may be removably attached to the vehicle (scooter).

The spinning housing may include an hourglass configuration comprising two halves, which may be identical, which holds internal components including a motor and circuit board. Further, the housing sits on top of the front scooter wheel and transfers rotational power from the wheel of the scooter to the internal components of the apparatus.

The rotation of the front wheel is used to power the motor, harnessing the resulting electricity to charge a mobile device. DC motors, like the one in embodiments of the present invention, turn when electricity is sent through them. If one turns a DC motor manually instead of using a battery, energy can be created. A back driving motor uses the rotational energy created manually by a wheel to create energy. The energy created is then modified and transmitted at a fixed voltage to the end charging hardware.

BRIEF DESCRIPTIONS OF DRAWINGS

DETAILED DESCRIPTION OF THE PRESENT INVENTION

The apparatus is situated so that it makes physical contact with the front wheel, causing the apparatus to rotate and back-drive the motor enclosed in the housing. In another variation, the housing may be disposed near the axle of the scooter. However, the apparatus may also be mounted on top of the front wheel of the scooter instead of along the axle, because this configuration enables the apparatus to efficiently increase the applications and perform of the device.

The rotation of the housing, created by the rotation of the front wheel, initiates the back-driven motor, which then generates a positive voltage that flows through the system. The resulting voltage is modified, through its internal electrical components, in order to be suitable for a mobile device charging. Through this apparatus, users can charge their mobile device while cruising through the city. The modularity of the invention makes it easy to change across scooters, allowing the user flexibility.

The invention relates to an apparatus for detachably mounting and charging mobile devices while traveling on a scooter. The term "mobile device" may refer to a smartphone, tablet, portable music player, or other portable, electrically charged consumer devices.

The illustrated embodiment shows a scooter-based energy generating and charging apparatus, comprising a mounting bracket, spinning housing, gearbox, and motor—the motor housing an electrical circuitry which regulates input voltage to generate a fixed output voltage, which charges the mobile device. The structure and operation of the apparatus will now be described with reference to the accompanying illustrations, depicted in FIGS. 1 and 2.

Figure 1:
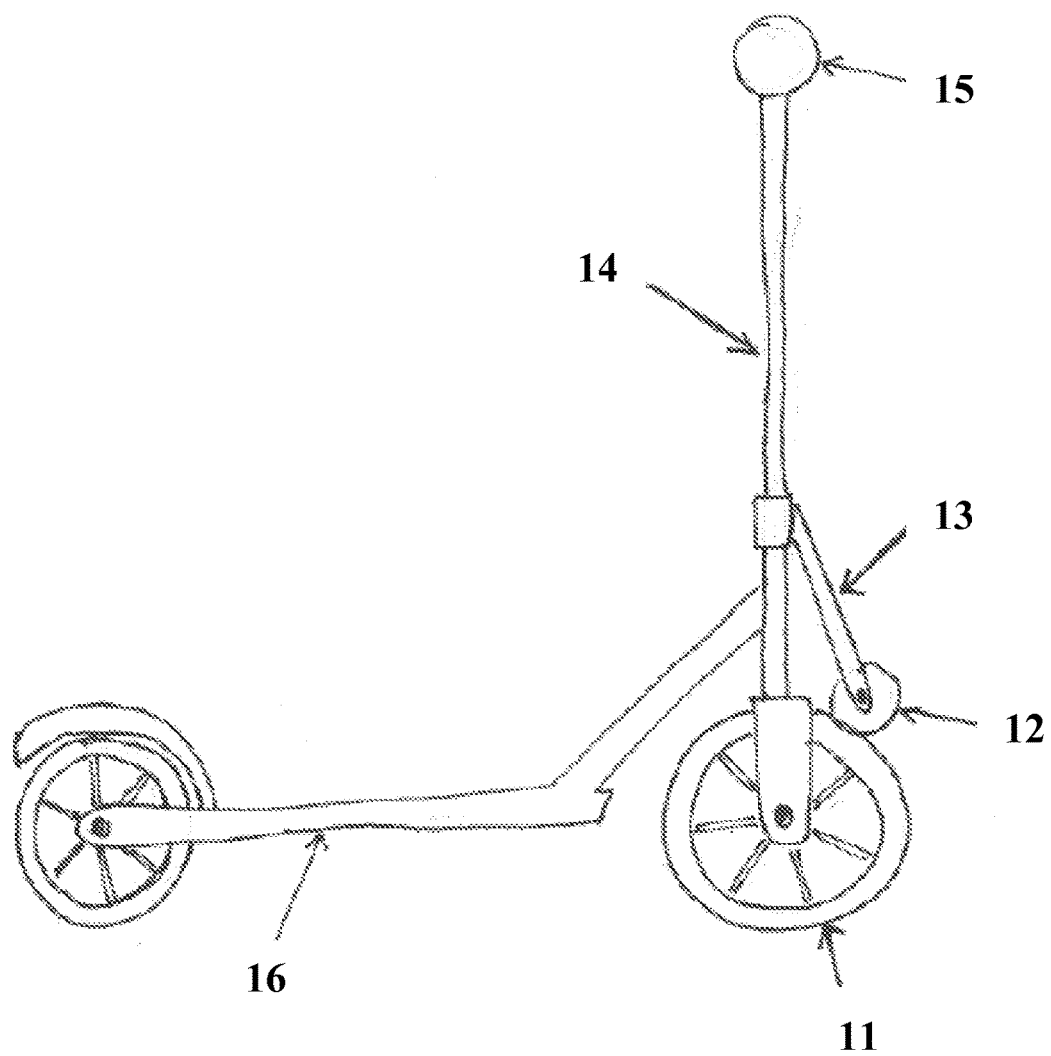
FIG. 1 illustrates a side view of a scooter with the apparatus mounted on its front wheel, according to an embodiment of the present invention.

FIG. 1 illustrates a side perspective view of a scooter with the energy generating and charging apparatus thereon. In one embodiment, the apparatus 12 may be placed near the axle (the point at which the spokes meet as depicted in the front wheel 11) of the front wheel 11 of the scooter. However, the apparatus 12 may also be mounted on top of the front wheel 11 of the scooter instead of along the axle of the scooter.

Using removeably attachable mounting brackets 13 comprising at least two axles protruding from the apparatus 12, and holding said apparatus 12 stationary to the stem 14 of the scooter, which allows the apparatus 12 to make contact with the front wheel 11 of the scooter. The apparatus 12 relies on the friction of the front wheel 11 to spin the housing 6 (see FIG. 2) of the apparatus 12. The brackets 13 coming out of the apparatus 12 are held stationary, thus keeping the body of the motor 4 (see FIG. 2) from spinning. The ordinary use of a scooter enables a user to travel by standing on the scooter chassis 16 and grasping the handlebars 15. As a user moves forward, the front wheel 11 of the scooter will rotate clockwise transferring rotational energy from the wheel 11 of the scooter to the mounted apparatus 12.

Figure 2:
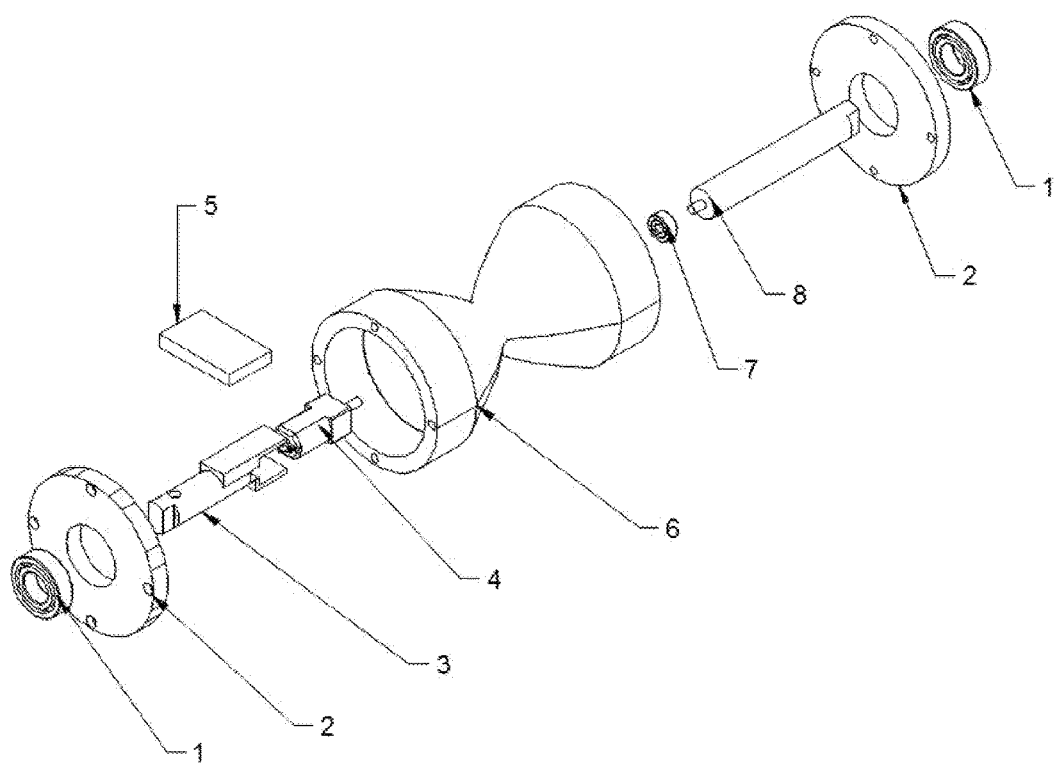
FIG. 2 illustrates an isometric exploded view of the apparatus, according to an embodiment of the present invention.

FIG. 2 shows an exploded view of apparatus 12. As shown in FIG. 2, the apparatus 12 comprises a housing 6, which comprises several internal components including a motor 4, motor-mounted axle 3, circuit board 5 and a support axle 8. In one embodiment, the housing 6 is constructed into an hourglass-shape, with an upper lobe, a waist, and a lower lobe. Each lobe may have a minimum diameter of 3.5 inches, with the maximum diameter being 4.5 inches, tapering at the waist of the housing. Further, the housing 6 may be constructed from two identical halves of ABS plastic with a weight of 2.7 oz (76.5 g) for a 3.5-inch (0.044 m) diameter. However, the use of ABS plastic, here, should not exclude the use of other similarly suited materials, such as, a different engineering plastic, a commodity plastic, a metallic, or a mixture thereof.

The housing 6 is sandwiched at the ends by circular endplates 2 to encapsulate the interior components of the apparatus 12. The size and weight of the endplates 2 will be dependent on the diameter of the housing 6 in addition to the material of the endplate 2. In an embodiment, the endplates 2 are constructed from ABS plastic at a diameter 3.5 inches, with a weight of 0.5 oz (14.2 g). The free rotation of the motor-mounted axle 3 is enabled by bearings 1 set into the circular endplates 2. However, the apparatus is not limited to bearings, but also includes any means of attachment to secure components to each other. In order to allow free rotation of the housing not encapsulating the motor 4 of the apparatus 12, in one embodiment a support axle 8 constructed from ABS plastic with a weight of 0.25 oz (7.1 g), is sandwiched between a rotational bearing 7 and an outer bearing 1, to aid in the rotational movement of the housing 6 around the support axle 8.

The apparatus 12 is disposed on top of the front wheel 11 of the scooter. It relies on the friction of the front wheel 11 to spin the housing 6 of the apparatus 12. The axles of the mounting brackets 13 are held stationary, thus keeping the body of the motor 4 from spinning. One embodiment of the interior of the apparatus comprises a motor 4, which is held in place by an adjacent motor-mounted axle 3. The motor-mounted axle 3 is constructed from ABS plastic with a weight 0.13 oz (3.7 g), which spins in conjunction with the front wheel 11 of the scooter. Alternatively, in other variations, the axle may be constructed from a different material, such as, a different engineering plastic, a commodity plastic, a metallic, or a mixture thereof.

The motor 4 uses a linear gearbox encased within the housing, having a minimum of 1:15 gear ratio. In an embodiment, a 1:15 gear ratio is achieved by using a 47 tooth, 10/34 tooth, and 10 tooth gear, all with a module of 0.5. The gears may be mounted by press-fitting a precision dowel pin through a pre-existing hole in the gear. In one embodiment, to back drive the motor 4 and create electricity, the apparatus 12 grabs onto a motor 4 (which may be a D-shaft motor) and spins it with the rotation of the housing 6 of the apparatus 12. Said housing 6 has a hole to match the D-shaft motor 4 profile, and locks the D-shaft motor 4 in rotation with the housing 6. In one embodiment, the D-shaft motor 4 has a back EMF constant of 0.47 mV/rpm (2127 rpm/V). Further, with the 1:15 gear ratio, a housing 6 diameter of 3.5 inches, and the back OAF constant of 2127 rpm/V the motor 4 should generate 1.35 volts at 2 mph (0.89 m/s).

The energy created by the motor 4 is then modified by the circuit board 5. In one embodiment, the circuit board 5 is coupled to the adjacent motor 4, mounted on the motor-mounted axle, to output a fixed voltage. In one embodiment, this is done using a buck-boost converter that can handle an input a voltage range of 3-12V and outputs a fixed voltage. The output voltage may range between 4.5V-5.5V. Since voltage is direction-dependent, it is advantageous to add a diode to eliminate the possibility of negative voltage. In one embodiment, the 1N5373Bn zener diode may be used. The resulting electricity of the motor 4 passes through the circuit board 5 to the charging hardware with a fixed output voltage. In one embodiment, the mobile apparatus is charged via a USB. However, the end charging hardware can be modified.

The descriptions of embodiments of the present invention are not intended to be an exhaustive classification, or limitations in scope of the invention. The specifications laid out represent an embodiment of the invention for purposes of clarity and disclosure. The scope of the invention should be measured by the claims.

What is claimed is:

1. An energy-generating and mobile-charging apparatus comprising:
   a housing comprising a shape featuring at least two lobes and a waist with a tapered portion that tapers continuously from the inner end of the lobes to the center portion of the waist, the waist coupled to the front wheel of the scooter, wherein the at least two lobes of the housing include a diameter of at least 3.5 inches, and wherein the housing is sandwiched by at least two circular endplates, a diameter of the two circular endplates being a same diameter as an end of the at the least two lobes;
   mounting brackets comprising at least two axles protruding from endplates of the housing for removably securing to a stem of the scooter and configured to be in contact with the front wheel of the scooter.

2. The energy generating and mobile-charging apparatus in accordance with claim 1, further comprising an interior linear gearbox with a minimum gear ratio of 1:15.

3. The energy generating and mobile-charging apparatus in accordance with claim 1, further comprising an motor coupled to an adjacent axle; and
   wherein the motor is coupled to a support axle to aid in the rotational movement of the housing; and
   the housing further comprising attachment means to secure the motor internally.

4. The energy generating and mobile-charging apparatus in accordance with claim 1, further comprising a circuit board;
   the circuit board comprising a converter to modify the variable input voltage into a fixed output voltage; and
   a diode.

5. The energy generating and mobile-charging apparatus in accordance with claim 1, further comprising an end charging hardware connected to the circuit board configured to be connected to a mobile device.

* * * * *